July 15, 1924.

J. GREELEY

SEED CORN DRIER

Filed July 23, 1923

1,501,328

Inventor
John Greeley.

By [signature]

Attorney

Patented July 15, 1924.

1,501,328

UNITED STATES PATENT OFFICE.

JOHN GREELEY, OF LAKE PARK, IOWA.

SEED-CORN DRIER.

Application filed July 23, 1923. Serial No. 653,282.

*To all whom it may concern:*

Be it known that I, JOHN GREELEY, a citizen of the United States, residing at Lake Park, in the county of Dickinson, State of Iowa, have invented certain new and useful Improvements in Seed-Corn Driers; and I do hereby declare the following to be a full, clear, and exact description of the invention, such as will enable others skilled in the art to which it appertains to make and use the same.

This invention relates to new and useful improvements in driers, and particularly to driers used for drying seed corn.

One object of the invention is to provide a device of this character which is simple in construction, cheap to manufacture, and which is proof against attacks of rodents.

Another object is to provide a device of this character wherein the moisture will be effectively evaporated from the corn, condensed, and delivered out of the device, and wherein a proper circulation of air is produced.

A further object is to provide a device of this character which will serve as a retainer for the corn and which will prevent entrance of moisture to the corn, after it has been dried, and set away until it is to be used in the spring.

Other objects and advantages will be apparent from the following description when taken in connection with the accompanying drawing.

Figures 1, 2:
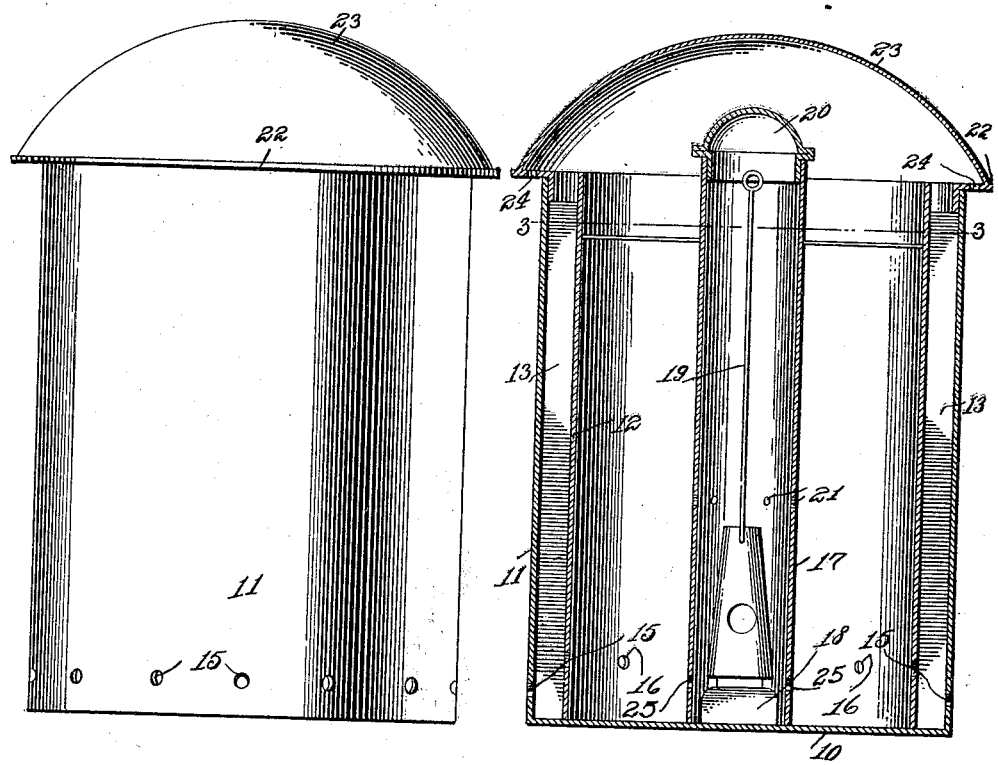
Figure 1 is an elevation of a seed corn drier made in accordance with the present invention.
Figure 2 is a vertical longitudinal central sectional view through the device.
Figure 3:
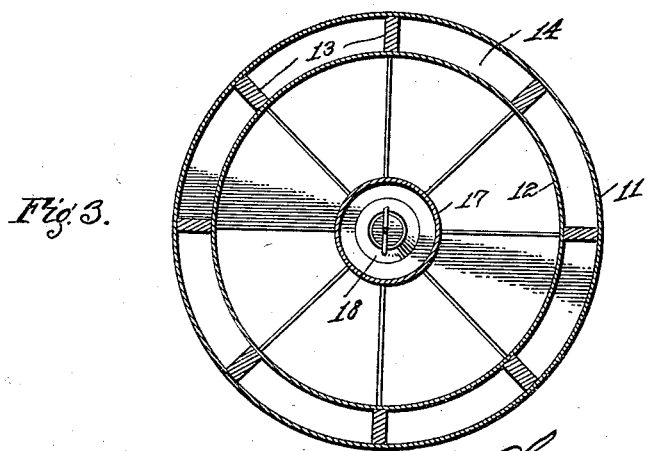
Figure 3 is a horizontal sectional view on the line 3—3 of Figure 2.

Referring particularly to the accompanying drawing, there is shown a cylindrical receptacle including the bottom 10 and the side wall 11 rising therefrom. Also rising from the bottom 10, in spaced concentric relation to the wall 11, and inwardly thereof, is a second wall 12, and disposed between these walls, are the longitudinal vertical spacing and bracing strips 13, whereby the walls are held in proper spaced relation, and the air space 14 formed therebetween. In the lower portion of the outer wall, at regularly spaced intervals, are formed the air inlet openings 15, and similarly formed in the inner wall 12 are the air inlet openings 16. Rising from the center of the bottom 10 is a tube 17, and located within the lower end of the tube is a heating lamp 18, the same being provided with an upwardly extending rod or wire 19, by means of which the lamp is lifted and lowered within the tube. A closure cap 20 is disposed removably within the upper end of the tube to prevent escape of the heat thereat, the heat escaping into the space surrounding the tube, through the exhaust openings 21, formed in the tube, intermediate its upper and lower ends. Disposed on the upper end of the receptacle, and fitting with its flange 22, in the upper end of the outer wall 11, is an upwardly arched, or dome-shaped cover or lid 23. The peripheral edge of the lid extends a short distance outwardly of the flange 22, and of the upper edge of the wall 11, wherein are formed the openings 24, to permit the condensation of the moisture, which collects on the inner face of the lid, to escape, and run down on the outside of the said wall. Should, however, any condensation fall between the walls 11 and 12, it can readily escape through the openings 15.

The seed corn to be dried, is placed within the space between the tube 17 and the wall 12. The heat from the lamp rises in the tube 17, and escapes through the openings 21 to the space containing the corn. The hot air, together with the moisture arising from the corn, passes upwardly until it strikes the lower face of the dome-shaped lid 23, where it is condensed and runs downward and outward toward the periphery of the lid, such condensation escaping through the openings 24.

In the lower end of the tube 17 there are formed the air inlet openings 25, which supply atmospheric air to aid the combustion in the lamp, such air passing from without the device, through the openings 15 and 16.

What is claimed is:

1. A seed corn drier including a receptacle having spaced walls, a heat tube within the receptacle and having heat discharging openings, a heating means in the tube, and a closure for the receptacle formed to condense moisture arising from the corn and provided with escape openings beyond the outer wall of the receptacle for the products of condensation.

2. A seed corn drier including a receptacle having concentric spaced walls provided with air inlet openings leading within the receptacle, a heating tube disposed centrally within the receptacle and having air inlet openings in its lower end and heat escape openings intermediate its ends, a heating means in the tube, a heat confining cap on the tube, and a dome-shaped cover for the receptacle having condensation escape openings for discharging the condensed moisture outwardly of the receptacle.

3. A seed corn drier comprising a receptacle having a bottom, concentric walls rising from the bottom and having air inlet openings adjacent their lower ends, a central tube rising from the bottom and having air inlet openings adjacent the lower end and heat escape openings intermediate its length, a heating means in the tube, a heat confining closure on the upper end of the tube, and a dome-shaped cover on the receptacle having its periphery extending beyond the outer wall and provided with openings through which escapes the condensed moisture which collects on the cover.

In testimony whereof, I affix my signature, in the presence of two witnesses.

JOHN GREELEY.

Witnesses:
J. DENKMANN,
N. ARENS.